(12) United States Patent
Floeder et al.

(10) Patent No.: US 8,270,701 B2
(45) Date of Patent: Sep. 18, 2012

(54) OPTICAL WEB-BASED DEFECT DETECTION USING INTRASENSOR UNIFORMITY CORRECTION

(75) Inventors: Steven P. Floeder, Shoreview, MN (US); Matthew V. Rundquist, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 441 days.

(21) Appl. No.: 12/684,170

(22) Filed: Jan. 8, 2010

(65) Prior Publication Data

US 2011/0170762 A1 Jul. 14, 2011

(51) Int. Cl.
G06K 9/00 (2006.01)
(52) U.S. Cl. .......................................... 382/141; 382/149
(58) Field of Classification Search .................. 382/274, 382/254, 260, 261, 263, 267–268, 272, 275, 382/308, 168–169, 171–172, 141–150; 250/205; 345/20, 63, 77, 581–618, 690, 697; 348/251, 348/254, 222.1; 358/461, 448
See application file for complete search history.

(56) References Cited

U.S. PATENT DOCUMENTS

| | | | |
|---|---|---|---|
| 4,602,291 A | 7/1986 | Temes | |
| 4,899,054 A | 2/1990 | Barfod | |
| 6,034,789 A | 3/2000 | Kawai | |
| 6,034,794 A | 3/2000 | Suganuma | |
| 6,687,396 B1 * | 2/2004 | Sugiura et al. | 382/141 |
| 6,757,442 B1 | 6/2004 | Avinash | |
| 7,026,608 B2 | 4/2006 | Hirai | |
| 7,027,934 B2 | 4/2006 | Skeps et al. | |
| 7,120,515 B2 | 10/2006 | Floeder et al. | |
| 7,187,995 B2 | 3/2007 | Floeder et al. | |
| 7,335,183 B2 | 2/2008 | Buiatti | |
| 7,599,541 B2 | 10/2009 | Hayashida | |
| 2001/0033678 A1 | 10/2001 | Hirai | |
| 2005/0033185 A1 | 2/2005 | Danen | |
| 2005/0047639 A1 | 3/2005 | Hayashida | |
| 2005/0151974 A1 | 7/2005 | Butterfield et al. | |
| 2005/0163341 A1 | 7/2005 | Han | |

FOREIGN PATENT DOCUMENTS

| | | |
|---|---|---|
| DE | 10340166 A1 | 3/2005 |
| EP | 0 533 976 A1 | 3/1993 |
| JP | 60241370 | 11/1985 |
| JP | 64-007174 | 1/1989 |
| TW | 380180 B | 1/2000 |

* cited by examiner

*Primary Examiner* — Tri T Ton
(74) *Attorney, Agent, or Firm* — Steven A. Bern

(57) ABSTRACT

Techniques are described in which an image capture device captures image data from web material. The image data comprises pixel values for the cross-web field of view of the image capture device. An analysis computer includes a computer-readable medium that stores parameters for a plurality of different normalization algorithms to normalize a cross-web background signal for the image capture device to a common desired value. The computer-readable medium further stores coefficients specifying a weighting for each of the plurality of normalization algorithms. The analysis computer computes a normalized value for each of the pixels of the image data as a weighted summation of results from application of at least two of the pixel normalization algorithms using the stored parameters.

16 Claims, 9 Drawing Sheets

OPTICAL WEB-BASED DEFECT DETECTION USING INTRASENSOR UNIFORMITY CORRECTION

TECHNICAL FIELD

The invention relates to automated inspection systems, and more particularly, to optical inspection of continuously moving webs.

BACKGROUND

Visual inspection systems for the analysis of moving web materials have proven critical to modern manufacturing operations. Industries as varied as metal fabrication, paper, non-wovens, and films rely on these automated inspection systems for both product certification and online process monitoring.

An automated visual inspection system for products manufactured on a continuously moving web typically utilizes one or more image capture devices to capture images of the web during manufacturing. Analysis computers apply image processing algorithms to detect anomalies that represent potential defects within the web. Areas of the web containing anomalies may be discarded if the anomalies rise to a classification level of a defect for a given product, or may be processed into other products that would be unaffected by the anomaly.

Linescan or linear array cameras are example image capture devices commonly used in manufacturing of moving materials. These cameras have a single array of pixel sensors for capturing image data. For example, an automated visual inspection system may utilize multiple line-scan cameras arranged to span the entire width of the moving web. Each of the line-scan cameras may include a linear arrangement of photodiode sensors that provide a line segment of image data (e.g., 2048×1 pixels). The collective image data provided by the arrangement of multiple line-scan cameras represents a single line of image data spanning the entire web in the cross-web direction. Other example image capture devices include multi-line matrix cameras, contact image sensors (CISs), and a raster-scan camera in which a laser sweeps across a defined portion of the web to generate image data.

In many cases, conventional visual inspection systems suffer from intra-device detection non-uniformity with respect to the individual image capture devices. That is, intra-device non-uniformity within one or more of the image capture devices may cause substantially identical web anomalies to be classified differently as a result of the anomalies lying within different areas of the field of view of the image capture device. Potential causes of this intra-device non-uniformity can include variations in the optical arrangement (e.g., lens profile) of the device, non-uniform illumination, characteristics of the material itself (e.g., polarization), and variance in light interaction with the material (e.g., angle effects) across the field of view of the image capture device.

SUMMARY

In general, this disclosure describes a visual inspection system for moving materials having intra-sensor non-uniformity correction. For example, this disclosure describes a flexible intra-device pixel normalization technique that is based on a recognition that existing techniques for normalizing a background response of a visual inspection system may achieve a uniform cross-web background signal across a field of view for a given image capture device, but may not necessarily result in uniform cross-web defect detection across the field of view of the image capture device. In other words, the techniques described herein are based on a recognition that, in some cases, a system response of the visual inspection system for defect detection relative to cross-web position may be different from a system response with respect to normalization of the background signal. That is, a mathematical algorithm that is applied to calibrate a visual inspection system to achieve cross-web background signal uniformity for a single image capture device may not necessarily lead to uniform treatment of potential defects across the field of view of that same image capture device.

To address this recognition, the techniques herein provide a flexible intra-device image correction technique that allows a user or automated software to select and adjust between normalization components taken from a plurality of different pixel normalization algorithms, such as gain-based or offset-based correction, so that the mathematical image manipulations for normalizing raw image data match a defect response for a manufactured material.

In one embodiment, a method comprises capturing image data from a web material using the image capture device, wherein the image data comprises an image of a cross-web portion of the web material across a field of view of the image capture device, applying a first one of a plurality of normalization functions to the image data to produce a first normalized value for each pixel of the image, and applying a second one of plurality of normalization functions to the image data to produce a second normalized value for each of the pixels. The method further comprises computing a final normalized value for each pixel as a sum of a portion of the first normalized value and a portion of the second normalized value for each of the pixels; and processing the final normalized values to identify regions on the web material containing anomalies that represent potential defects in the web material.

In another embodiment, a system comprises an image capture device to capture image data from the web material. The image data comprises pixel values for the cross-web field of view of the image capture device. The system includes a computer-readable medium storing parameters for a plurality of different normalization algorithms to normalize a cross-web background signal for the image capture device to a common desired value. The computer-readable medium further stores a coefficient for each of the plurality of normalization algorithms. An analysis computer computes normalized value for each of the pixels of the image data as a weighted summation of results from application of at least two of the pixel normalization algorithms using the stored parameters, where the stored coefficients define weightings for the results of each of the different normalization algorithms.

In another embodiment, a system comprises a computer-readable medium storing parameters for a plurality of different normalization algorithms to normalize a cross-web background signal for an image capture device to a common desired value. The computer-readable medium further stores a coefficient for each of the plurality of normalization algorithms. An analysis computer receives image data having values for pixels of a cross-web field of view of the image capture device and computes normalized value for each of the pixels of the image data as a weighted summation of results from application of at least two of the pixel normalization algorithms using the stored parameters. The stored coefficients define weightings for the results of each of the different normalization algorithms that produce a uniform treatment of defects in a web across the field of view of the image capture device.

In another embodiment, a computer-readable storage medium comprising program code having instructions that cause a programmable processor to receive image data from a web material using the image capture device, wherein the image data comprises an image of a cross-web portion of the web material across a field of view of the image capture device. The instructions further cause the processor to apply a first one of a plurality of normalization functions to the image data to produce a first normalized value for each pixel of the image, apply a second one of plurality of normalization functions to the image data to produce a second normalized value for each of the pixels, and compute a final normalized value for each pixel as a sum of a portion of the first normalized value and a portion of the second normalized value for each of the pixels. The instructions further cause the processor to process the final normalized values to identify regions on the web material containing anomalies that represent potential defects in the web material.

The techniques described herein may provide certain advantages. For example, the techniques may obtain detection uniformity such that the location of a web anomaly within a field of view of an image capture device does not affect the classification of the anomaly as a defect. In other words, the techniques may allow detection of a defect having given characteristics (e.g., size, shape and density) to be unaffected by the location of the defect within a field of view of an image capture device. Moreover, the techniques provide the flexibility to adjust the correction method and its constituent components to match a defect response for the particular type and characteristics of the manufactured material.

Examples of computerized decision making using web inspection systems are described in U.S. Pat. No. 7,120,515, "METHOD FOR CONTROLLING INVENTORY OF WEB BASED ARTICLES" and U.S. Pat. No. 7,187,995, "MAXIMIZATION OF YIELD FOR WEB-BASED ARTICLES," both to Steven P. Floeder et. al, the entire contents of each which are incorporated herein by reference.

DETAILED DESCRIPTION

Figure 1:
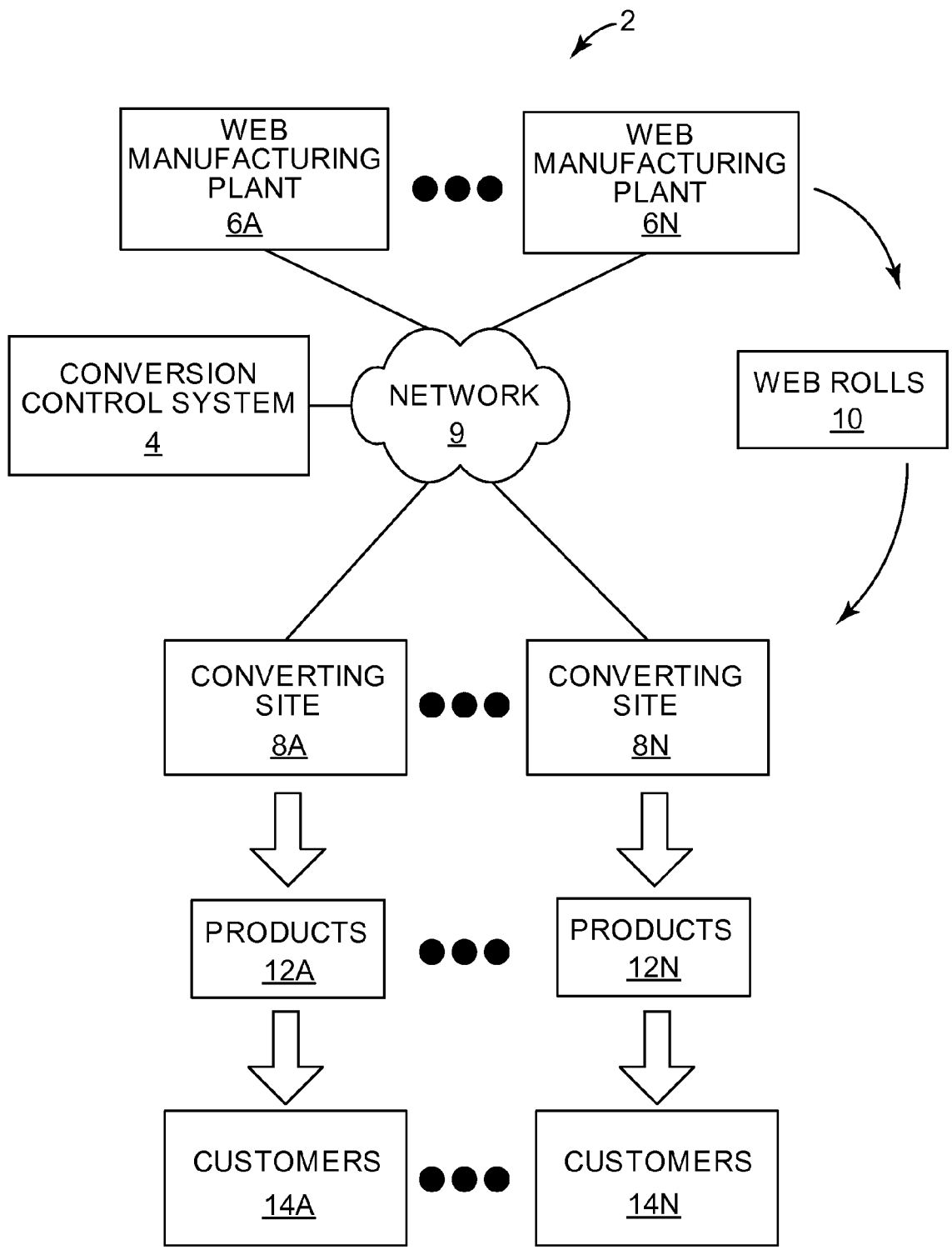
FIG. 1 is a block diagram illustrating a global network environment in which a web material is manufactured and converted to products.

FIG. 1 is a block diagram illustrating a global network environment 2 in which conversion control system 4 controls conversion of web material. More specifically, web manufacturing plants 6A-6N represent manufacturing sites that produce and ship web material in the form of web rolls 10. Web manufacturing plants 6A-6N may be geographically distributed.

The manufactured web material may include any sheet-like material having a fixed dimension in one direction and either a predetermined or indeterminate length in the orthogonal direction. Examples of web materials include, but are not limited to, metals, paper, wovens, non-wovens, glass, polymeric films, flexible circuits or combinations thereof. Metals may include such materials as steel or aluminum. Wovens generally include various fabrics. Non-wovens include materials, such as paper, filter media, or insulating material. Films include, for example, clear and opaque polymeric films including laminates and coated films.

For many applications, the web materials of web rolls 10 may have an applied coating, which generally are applied to an exposed surface of the base web material. Examples of coatings include adhesives, optical density coatings, low adhesion backside coatings, metalized coatings, optically active coatings, electrically conductive or nonconductive coatings, or combinations thereof. The coating may be applied to at least a portion of the web material or may fully cover a surface of the base web material. Further, the web materials may be patterned or unpatterned.

Web rolls 10 are shipped to converting sites 8A-8N, which may be geographically distributed within different countries. Converting sites 8A-8N ("converting sites 8") convert each web roll 10 into one or more products. Specifically, each of converting sites 8 includes one or more process lines that physically cut the web for a given web roll 10 into numerous individual sheets, individual parts, or numerous web rolls, referred to as products 12A-12N. As one example, converting site 8A may convert web rolls 10 of film into individual sheets for use in mobile phone displays or computer monitors. Similarly, other forms of web materials may be converted into products 12 of different shapes and sizes depending upon the intended application by customers 14A-14N. Each of converting sites 8 may be capable of receiving different types of web rolls 10, and each converting site may produce different products 12 depending on the location of the converting site and the particular needs of customers 14.

As described in detail herein, each of web manufacturing plants 6 includes one or more automated visual inspection systems (not shown in FIG. 1) that utilizes one or more image capture devices to capture images of the web during manufacturing. One or more of the visual inspection systems apply the techniques described herein to provide intra-device image correction that results not only in a normalized background intensity signal for the image capture device but a substantially normalized system response with respect to defect detection. The techniques may utilize an intra-device pixel normalization algorithm that combines components of different normalization algorithms, such as gain-based correction and offset-based correction, to address non-uniformity of individual image capture devices. The techniques allow a user, such as a process engineer, to define proportioned normalization values and adjust the components taken from a plurality of different pixel normalization algorithms, such as gain-based correction and offset-based normalization, so that the mathematical image manipulations for normalizing raw image data match a defect response for a manufactured material.

After application of the image correction algorithms, the inspection systems of web manufacturing plants 6 perform preliminary examination of the webs using a first, typically less sophisticated algorithm to identify manufacturing anomalies, accepting the likelihood that although some of the anomalies may prove defective, many could be "false positives," i.e., anomalies that are not defective. In fact, products 12 have different grade levels, also referred to as quality levels, and have different tolerances for manufacturing anomalies. As a result, some of the anomaly areas may be ultimately classified as defective if the corresponding web roll 10 is converted to a particular product 12, but not defective if the web roll is converted to a different product.

Web manufacturing plants 6 communicate image information about the regions of the web containing anomalies to conversion control system 4 via network 9 for subsequent processing. Conversion control system 4 applies one or more defect detection algorithms that may be application-specific, i.e., specific to products 12. Based on the analysis, conversion control system 4 determines, in an automated or semi-automated manner, which of products 12 would allow a particular web roll 10 to achieve a maximum yield (i.e., utilization) of the web. Based on the determination, conversion control system 4 generates a conversion plan for each web roll 10, i.e., defined instructions for processing the web roll, and communicates the conversion plan via network 9 to the appropriate converting site 8 for use in converting the web into the selected product.

In certain embodiments, conversion control system 4 may make such determinations for individual converting sites 8. In other words, conversion control system 4 may identify the web rolls destined for each converting site 8, and generate conversion plans based on the products 12 associated with the individual converting sites. For example, conversion control system 4 may identify the web rolls destined for converting site 8A, and generate conversion plans to maximize yield for the web rolls based on the products 12A produced by converting site 8A.

Alternatively, conversion control system 4 may generate the conversion plans for web rolls 10 prior to their shipment to converting sites 8. Consequently, conversion control system 4 may consider all of the potential available products 12 when generating corresponding conversion plans for web rolls 10. In this manner, conversion control system 4 may consider all of the potentially available products 12 in order to, for example, maximize the yield of each web roll 10. In this configuration, conversion control system 4 generates conversion plans and outputs instructions identifying the specific converting sites 8 to which each of web rolls 10 should be shipped.

In some embodiments, conversion control system 4 considers other parameters when selecting the respective converting sites 8 for web rolls 10. Such parameters include, but are not limited to, current inventory levels of products 12 at each of converting sites 8, recent orders received from customers 14, shipment time and cost associated with each of converting sites 8, methods of available shipment and other parameters.

In this manner, conversion control system 4 applies application-specific defect detection algorithms to the anomaly information received from web manufacturing plants 6, and ultimately directs the conversion of web rolls 10 into products 12 based on one or more parameters. As illustrated below, these factors may be user selectable, and may be applied independently or collectively using a weighting function or other technique.

Figure 2:
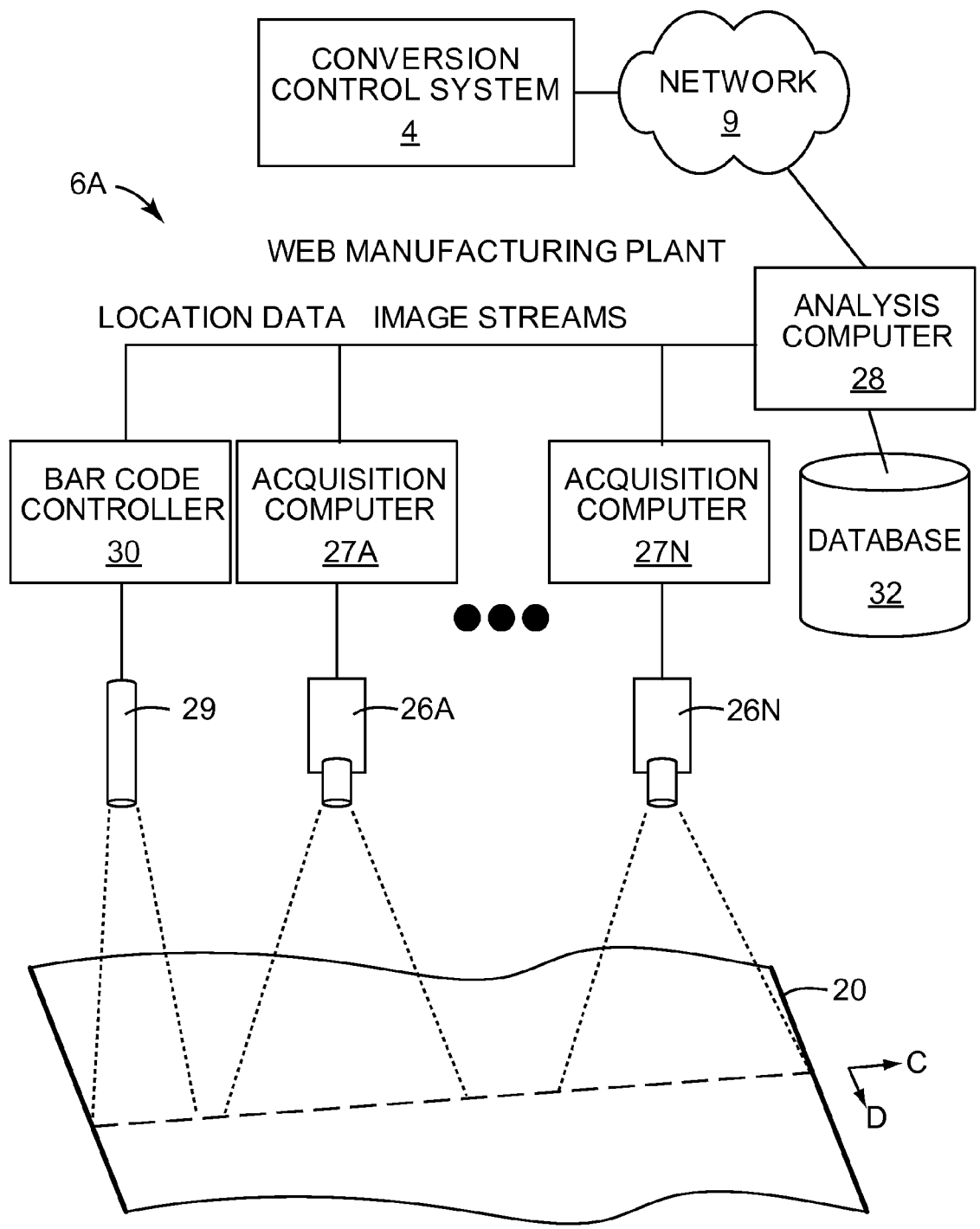
FIG. 2 is a block diagram illustrating an exemplary embodiment of a web manufacturing plant.

FIG. 2 is a block diagram illustrating an exemplary embodiment of web manufacturing plant 6A of FIG. 1. In the exemplary embodiment, a segment of a continuously moving web 20 may be positioned between two support rollers.

In one example, image capture devices 26A-26N are positioned in close proximity and aligned in a cross-web arrangement so as to provide image data that spans the entire width of moving web 20. That is, image capture devices 26 collect image data for adjacent, possibly overlapping, line segments of web 20 so as to collectively provide image data for an entire cross-web portion of the web. Acquisition computers 27 collect image data from image capture devices 26, and transmit the image data to analysis computer 28 for preliminary analysis. For purposes of example, web 20 is shown in FIG. 2 as moving in a direction D and having a cross-web direction C.

Image capture devices 26 may be conventional imaging devices that are capable of reading a sequential portion of the moving web 20 and providing output in the form of a digital data stream. As shown in FIG. 2, imaging devices 26 may be cameras that directly provide a digital data stream or an analog camera with an additional analog to digital converter. Other sensors, such as, for example, laser scanners may be utilized as the imaging acquisition device. A sequential portion of the web indicates that the data is acquired by a succession of single lines. Single lines comprise an area of the continuously moving web that optically maps to a single row of sensor elements or pixels. Examples of devices suitable for acquiring the image include linescan cameras such as Model#LD21 from Perkin Elmer (Sunnyvale, Calif.), Piranha Models from Dalsa (Waterloo, Ontario, Canada), or Model#TH78H15 from Thompson-CSF (Totawa, N.J.). Additional examples include laser scanners from Surface Inspection Systems GmbH (Munich, Germany) in conjunction with an analog to digital converter.

The image may be optionally acquired through the utilization of optic assemblies that assist in the procurement of the image. The assemblies may be either part of a camera, or may be separate from the camera. Optic assemblies utilize reflected light, transmitted light, or transflected light during the imaging process. Reflected light, for example, is often suitable for the detection of defects caused by web surface deformations, such as surface scratches.

Barcode controller 30 controls barcode reader 29, which may be used to input roll and position information from web 20. Barcode controller 30 communicates the roll and position information to analysis computer 28.

Analysis computer 28 processes image streams from acquisition computers 27. More specifically, analysis computer 28 may apply one or more pre-processing algorithms to the image streams prior the generating anomaly information. As one example, analysis computer 28 applies an image correction algorithm as described herein to correct for any intra-device non-uniformity that may be exhibited by any of image capture devices 26. As described in further detail below, analysis computer 28 applies an intra-device pixel normalization algorithm that normalizes raw video data received from acquisition computers 27. Moreover, the intra-device pixel normalization algorithm normalizes the pixel values to a target light level with respect to sensed differences from a background signal at each pixel, yet normalizes the pixel values using a polynomial having coefficients that are tuned to match a system response with respect to defect detection. In this way, the intra-device pixel normalization algorithm achieves pixel normalization and uniformity with respect to a level of a background signal and a defect response across then entire field of view for the given image capture device. Analysis computer 28 may apply the intra-device pixel normalization algorithm separately to each of the image data streams received from the different image acquisition computers and the corresponding image capture devices 26. For each of the image capture devices 26, for example, analysis computer 28 may apply an intra-device pixel normalization algorithm that has been tailored to combine constituent components of different normalization algorithms (e.g., gain-based correction and offset-based correction) in view of the specific intra-device non-uniformity characteristics exhibited by the particular image capture device in combination with the product under inspection. Although described for purposes of example with respect to analysis computer 28, acquisition computers 27 may instead apply the image correction algorithm prior to communicating the video data to the analysis computer.

After pre-processing the image data, analysis computer 28 processes the digital information with one or more anomaly identification algorithms to generate anomaly information that identifies any regions of web 20 containing anomalies that may ultimately qualify as defects. For each identified anomaly, analysis computer 28 extracts from the image data an anomaly image that contains pixel data encompassing the anomaly and possibly a surrounding portion of web 20.

Analysis computer 28 stores roll information, position information and anomaly information within database 32. Database 32 may be implemented in any of a number of different forms including a data storage file or one or more database management systems (DBMS) executing on one or more database servers. The database management systems may be, for example, a relational (RDBMS), hierarchical (HDBMS), multidimensional (MDBMS), object oriented (ODBMS or OODBMS) or object relational (ORDBMS) database management system. As one example, database 32 is implemented as a relational database provided by SQL Server™ from Microsoft Corporation.

Analysis computer 28 communicates the roll information as well as anomaly information and respective sub-images to conversion control system 4 for subsequent, offline, detailed analysis. For example, the information may be communicated by way of a database synchronization between analysis computer 28 and conversion control system 4.

Figure 3:
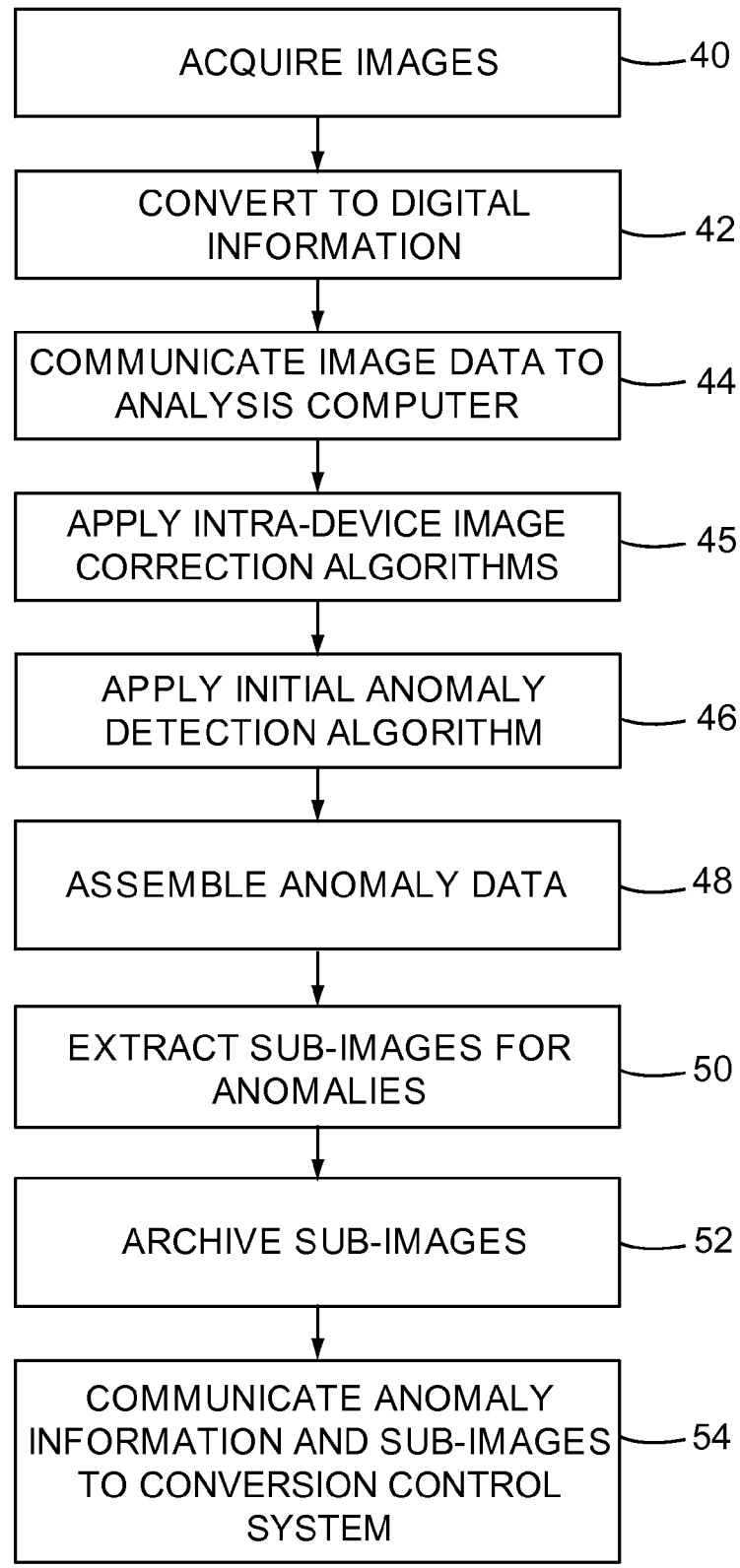
FIG. 3 is a flowchart illustrating exemplary operation of the web manufacturing plant.

FIG. 3 is a flowchart illustrating exemplary operation of web manufacturing plant 6A. Initially, image capture devices 26 and acquisition computers 27 acquire image data from moving web 20 (40). The image data may be formed digitally, e.g., by way of a digital video camera, or may be converted to digital information (42). In either case, acquisition computers 27 output streams of digital image information to analysis computer 28 (44).

Analysis computer 28 applies an intra-device pixel normalization algorithm to each of the image data streams, where the parameters of the algorithm have been configured to control a combined application of different pixel normalization techniques, such as gain-based correction and offset-based correction (45).

Analysis computer 28 then applies an anomaly detection algorithm to identify regions of the web containing anomalies (46). In some convenient embodiments, the initial anomaly detection algorithm is very fast so as to be capable of being performed in real time by general purpose computing equipment even if a line speed of moving web 20 is great. As a result, some of the identified regions containing anomalies may include "false positives." Even though there may be many false positives, the initial algorithm is preferably designed such that "escapes," i.e., true defects not detected as anomalies rarely, if ever, occur.

Upon applying the initial anomaly detection algorithm, analysis computer 28 assembles anomaly data about the identified regions and stores the anomaly data within database 32 (48). The data typically includes a start position of the anomaly within the web and an encompassing pixel area of each identified region. During this process, analysis computer 28 extracts a portion of the image data for each identified region containing an anomaly (50). Specifically, only a fraction of the original digital image information needs to be extracted for further, more sophisticated analysis by conversion control system 4. The identified regions typically contain information, for example, at least an order of magnitude less than the digital information, as indicated by size in any convenient measure such as file size in bytes.

The extracted anomaly images may be stored in a database 32 or a file server (not shown) (52) and subsequently communicated to conversion control system 4 along with the anomaly and roll information (54). Alternatively, the roll information, anomaly information and anomaly images may be transferred directly for processing by conversion control system 4.

Figure 4:
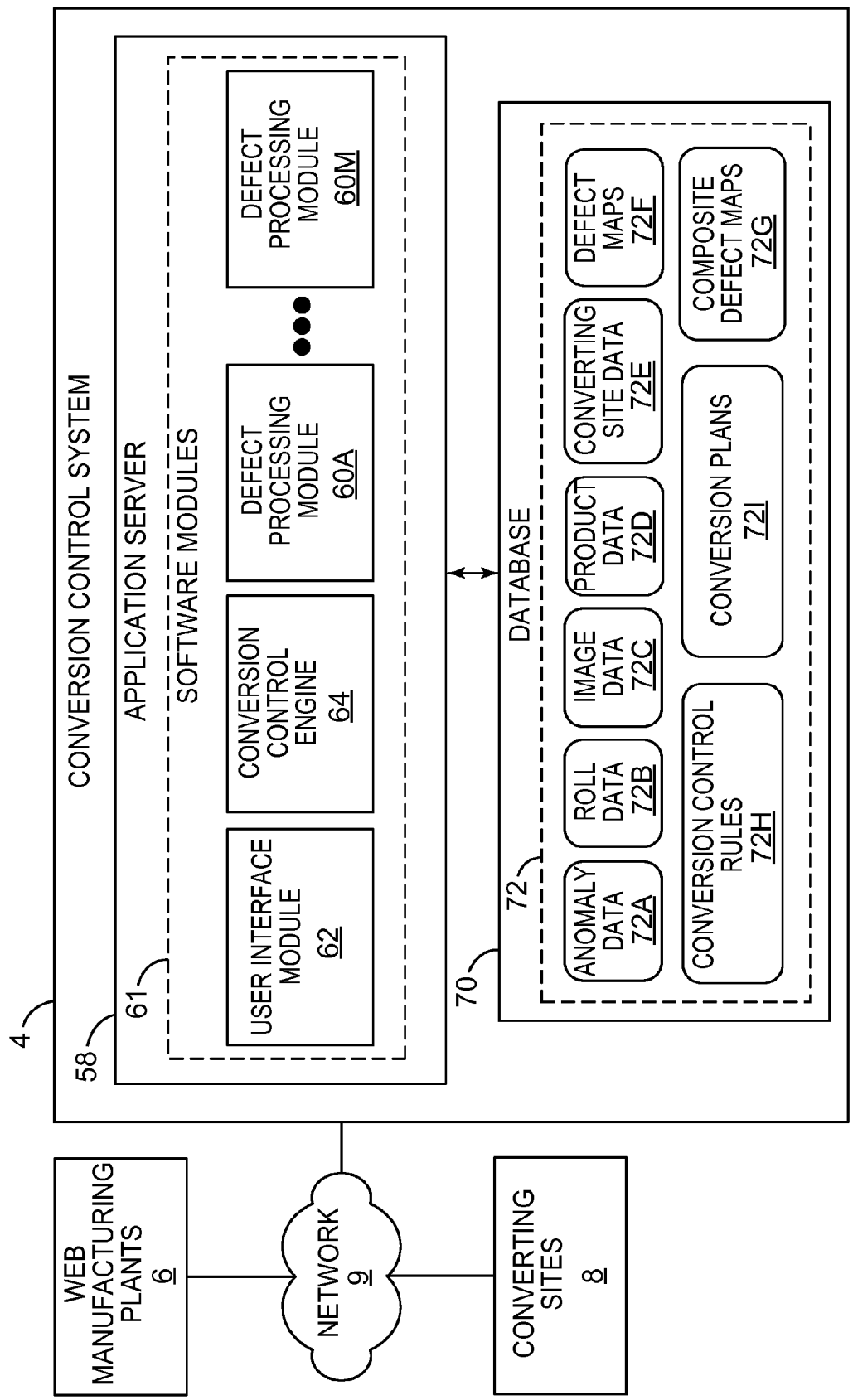
FIG. 4 is a block diagram illustrating an example embodiment of a conversion control system.

FIG. 4 is a block diagram illustrating an example embodiment of conversion control system 4 in further detail. In the example embodiment, application server 58 provides an operating environment for software modules 61. Software modules include a plurality of defect processing modules 60A-60M, a user interface module 62 and a conversion control engine 64.

Software modules 61 interact with database 70 to access data 72, which may include anomaly data 72A, roll data 72B, image data 72C, product data 72D, converting site data 72E, defect maps 72F, composite defect maps 72G, conversion control rules 72H, and conversion plans 72I.

Database 70 may be implemented in any of a number of different forms including a data storage file or one or more database management systems (DBMS) executing on one or more database servers. As one example, database 32 is implemented as a relational database provided by SQL Server™ from Microsoft Corporation.

Anomaly data 72A, roll data 72B, and image data 72C represent the roll information, anomaly information and respective anomaly images received from web manufacturing plants 6 (FIG. 1). Product data 72D represents data associated with products 12 (FIG. 1). More specifically, product data 72D defines each type of product 12 producible by each converting site 8. For each product 12, product data 72D specifies one or more defect processing modules 60 that are required to determine whether a given web roll 10 satisfies the quality requirements for the particular product. In other words, product data 72D specifies one or more defect processing modules 60 that are to be used to analyze anomaly data 72A and image data 72C for each product 12.

Converting site data 72E represents data associated with converting sites 8. For example, converting site data 72E may stores site location, number of process lines and a current available capacity of each process line for each of converting sites 8. Converting site data 72E may store other data, including but not limited to, data specifying a current level of inventory for each product 12 at each converting site 8, shipments costs associated with shipping a web roll to each converting site, shipment options available for each converting site, current order information from customers 14 received by each converting site, data specifying new or preferred customers for each converting site, and other data that may be useful in selecting conversion plans.

As described in further detail below, defect processing modules 60 output defect maps 72F that specify which anomalies are considered actual defects for the different products 12. In other words, each defect map 72F corresponds to a particular web roll 10 and a specific product 12. Each defect map 72F specifies the particular defect locations of a particular web roll 10 based on the product-specific requirements of the corresponding product 12.

Conversion control engine 64 analyzes defect maps 72F in accordance with conversion control rules 72H to select the ultimate conversion used for each of the web rolls 10. For example, conversion control engine 64 may analyze defect maps 72F to determine which of products 12 would allow a particular web roll 10 to achieve a maximum yield (i.e., utilization) of the web. Conversion control rules 72H specify one or more parameters for consideration by conversion control engine 64 when processing defect maps 72F, such as usage of web material, the number of units that would be produced by each of web rolls 10 for the different products 12, an estimated amount of revenue or profit that would be produced by the web roll for each potential product 12, a process time that would be required to convert the web for each of the different products, a current machine capacity for each process line within converting sites 10, current levels of demand for each of products 12 and other parameters.

During this process, conversion control engine 64 may determine that a particular web roll 10 may be best utilized (e.g., may achieve maximum yield) if converted into multiple products 12. In other words, conversion control engine 64 may determine that a first portion of the web may be best utilized when converted to a first product, and a second portion for a different product. In this case, conversion control engine 64 generates a "composite" defect map 72G that specifies the defect locations within each portion of the web based on the corresponding product to which the portion is to be converted. Conversion control engine 64 may create the composite defect maps by splicing portions of two or more defect maps 72F to form a complete, composite defect map for the entire web.

Upon selecting a particular product or set of products for a given web roll 10, conversion control engine 64 generates a respective conversion plan 72I. Each conversion plan 72I provides precise instructions for processing the respective web roll. More specifically, each conversion plan 72I defines configurations for processing lanes to physically slice the web into individual product sheets. Conversion control system 4 outputs shipment instructions directing the shipment of each web roll 10 to a respective destination converting site 8. Further, conversion control system 4 communicates conversion plans via network 9 to the appropriate converting sites 8 for use in converting the web rolls into the selected products.

User interface module 62 provides an interface by which a user can configure the parameters used by conversion control engine 64. For example, user interface module 62 allows the user to direct conversion control engine 64 to consider one or more of a maximum web utilization, number of units produced, estimated revenue, estimated profit, machine capacity, current levels of demand and/or other parameters.

Figure 5:
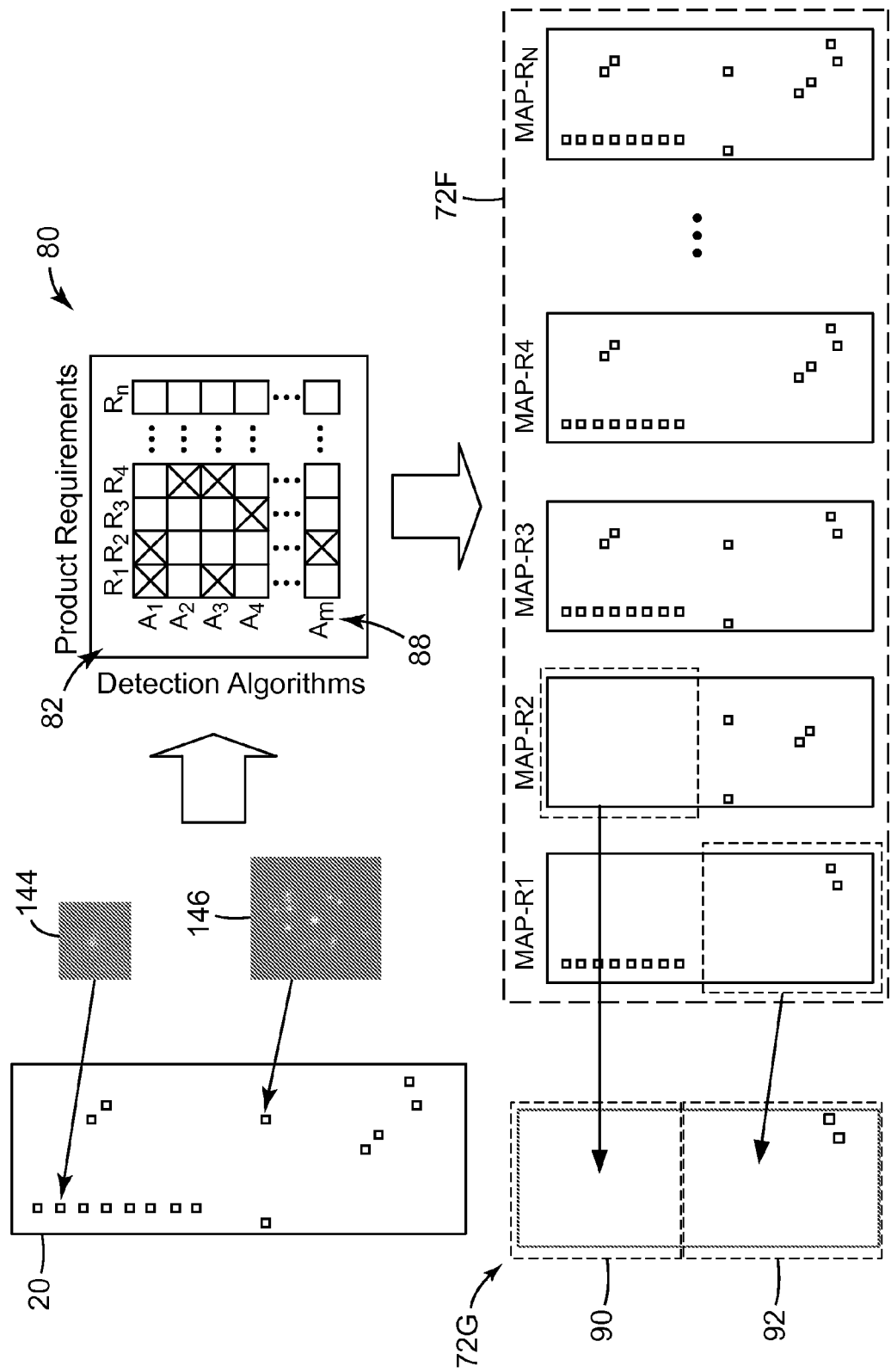
FIG. 5 is a flow diagram that illustrates exemplary processing of anomaly information by the conversion control system.

FIG. 5 is a flow diagram that illustrates the processing of anomaly information by conversion control system 4 in further detail. In particular, FIG. 5 illustrates the processing of anomaly data 72A and image data 72C by defect processing modules 60.

Conversion control system 4 receives the image and anomaly data, such as images 144, 146, that were extracted initially from a web 20 by an analysis computer 28 located at a web manufacturing plant 6 using a simple first detection algorithm.

As illustrated in FIG. 5, defect processing modules 60 apply "M" different algorithms (designated $A_1$-$A_m$ 88 in FIG. 5) as needed for up to N different requirements 80 for products 12. Cross-reference table 82 of FIG. 5 is used to illustrate the mapping between requirements 80 and defect processing modules 60. Specifically, cross-reference table 82 shows which defect processing modules 60 are utilized in determining whether each anomaly is a defect or a false positive for a given requirement 80.

In some embodiments, a larger number of rather simpler algorithms are conveniently used in parallel. In particular, it is often convenient that at least one of the subsequent defect processing modules 60 apply an algorithm that includes comparing each anomaly against a combination threshold-pixel size criterion. In actual practice with, for example, optical films, an anomaly having only a subtle difference in brightness value from a target is unacceptable if the area is large, and an anomaly having a great difference in brightness from a target value is unacceptable even if the area is very small.

In addition, the algorithms applied by defect processing modules 60 can incorporate very complex image processing and defect extraction including, but not limited to, neighborhood averaging, neighborhood ranking, contrast expansion, various monadic and dyadic image manipulations, digital filtering such as Laplacian filters, Sobel operators, high-pass filtering and low-pass filtering, texture analysis, fractal analysis, frequency processing such as Fourier transforms and wavelet transforms, convolutions, morphological processing, thresholding, connected component analyses, blob processing, blob classifications, or combinations thereof. Other algorithms may be applied based on the specific web and defect types to achieve a desired accuracy level of defect detection.

Each of the N product requirements 88 can be accomplished using selected combinations of individual defect processing requirements 82. The algorithms may use very simple threshold and minimum blob processing or more complex algorithms such as spatial filters, morphological operations, frequency filters, wavelet processing, or any other known image processing algorithms. In this exemplary cross-reference table 82, product requirement $R_1$ uses a combination of algorithms $A_2$, $A_4$, and $A_M$, each applied to every anomaly image to determine which anomalies are actual defects for $R_1$. In most convenient embodiments, a simple OR logic is employed, i.e. if any of $A_2$, $A_4$, and $A_M$ report the anomaly as an actual defect, that portion of web 20 does not satisfy product requirement $R_1$. For specialized applications, the logic through which the reports of the subsequent requirements 82 are combined into a determination of whether a product requirement 80 is satisfied may be more complex than a simple OR logic. Similarly, product requirement $R_2$ uses $A_2$, $A_3$, and $A_4$, etc. Thus, the anomalies that are identified as defects for $R_2$ may be similar to or significantly different than defects for $R_1$.

After determining which anomalies are considered actual defects by using cross-reference table 82, conversion control engine 64 formulates defect maps 72F of actual defect locations corresponding to the various product requirements for the roll. In some situations, conversion control engine 64 may generate one or more composite defect maps 72G by splicing one or more portions of defect maps 72F. In this illustrated example, conversion control engine 64 generates a composite map 72G having a first portion 90 spliced from a defect map for a first product requirement (MAP-R1) and a second portion 92 from a defect map for a second product requirement (MAP-R2). In this manner, conversion control engine 64 may determine that a web may be best utilized if certain portions of the web are converted into different products. Once this has been done, it is often possible to discard the subimage information to minimize the needed storage media.

Further details of image processing and subsequent application of the anomaly detection algorithms applied by defect processing modules 60 are described by commonly assigned and co-pending U.S. patent application Ser. No. 10/669,197, entitled "APPARATUS AND METHOD FOR AUTOMATED WEB INSPECTION," having Attorney Docket No. 58695US002, filed Apr. 24, 2003, the entire contents of which are incorporated herein by reference The intra-device pixel normalization techniques described herein make use of a recognition that existing techniques for normalizing a background response of a visual inspection system to achieve a uniform background signal for a given image capture device may not necessarily result in uniform defect detection. In other words, the techniques described herein are based on a recognition that, in some cases, a system response of the visual inspection system for defect detection may be different from a system response with respect to normalization of the background signal. That is, a mathematical algorithm that is applied to calibrate a visual inspection system to achieve cross-web background intensity signal uniformity for a single image capture device may not necessarily lead to uniform treatment of potential defects across the field of view of that same image capture device.

To address this recognition, the techniques herein provide a flexible intra-device image correction technique that allows a user, such as a process engineer, or automated software to define and adjust the normalization components taken from a plurality of different pixel normalization algorithms, such as gain-based correction and offset-based normalization, so that the mathematical image manipulations for normalizing raw image data match a defect response for a manufactured material. FIGS. 6A-6D provide a simple example illustrating these concepts.

Figure 6A:
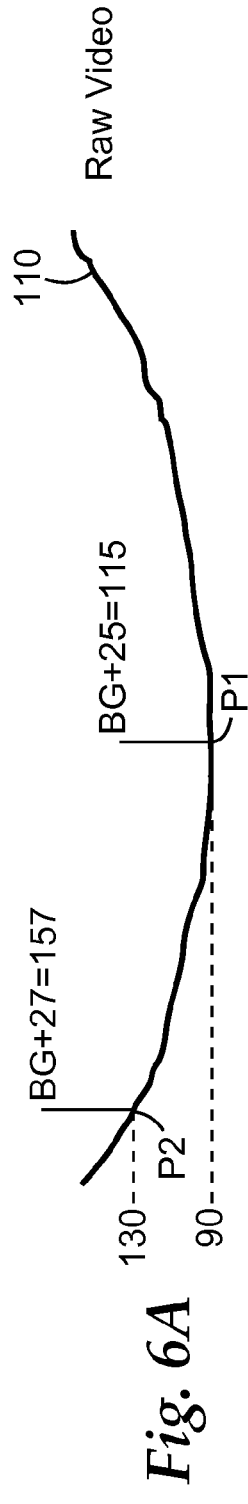
FIGS. 6A-6D are plots showing theoretical image data from an image capture device of a web inspection system, where the image data has been normalized using different correction algorithms.

FIG. 6A is a plot showing example raw image data 110 of a background signal output from a single image capture device prior. That is, in this example, raw image data 110 illustrates the background signal output by the image capture device for a single pixel line in a cross-web direction from a uniform, calibration background material. In this example, at a center pixel P1 of the single line scan, background signal 110 has a value of 90 units, e.g., grey levels. A given defect in the center of the image capture device may increase light intensity by an additional 25 units, for a reading of 115 units. However, in some cases, a defect having the exact same physical characteristics in terms of size, shape and density, located at the edge of the field of view (pixel P2 in this example) may result in an increase light intensify of 27 units for a reading of 157 units. This may be caused, for example, by differences in lighting angle at the two positions, variance in material response to the different lighting angle, variance in optical characteristics of a photosensor at the different positions or other optical components of the image capture device, or local differences in environmental conditions, such as temperature.

Figure 6B:
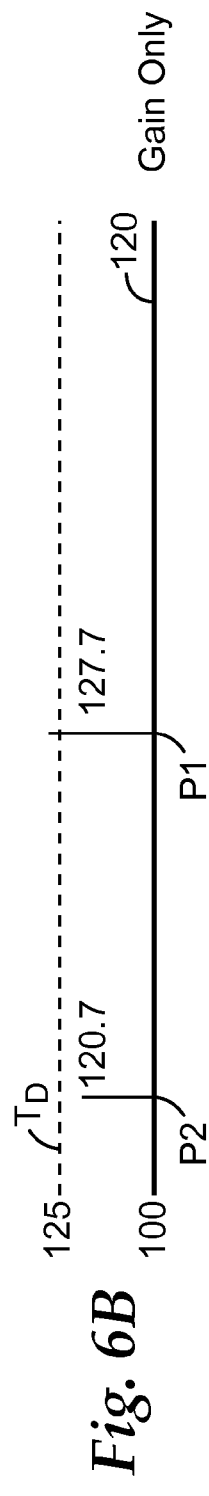

FIG. 6B illustrates example results in the event a gain-only pixel normalization approach is utilized to normalize the background signal to a uniform target light level of 100 units. In this example, scaling factors for each pixel position are calculated for the cross-web locations of the field of view and applied to the corresponding reading at that position. In general, a scaling factor for a particular cross-web pixel location can be calculated as follows:

Scaling Factor=Target Normalized Value/Average (i.e. Background) Pixel Value.

For example, given a target normalization value of 100, a scaling factor $S_{P1}$ for pixel location P1 can be calculated as follows:

$S_{P1}=100/90=1.111$.

Similarly, a scaling factor $S_{P2}$ for pixel location P2 can be calculated as follows:

$S_{P2}=100/130=0.769$.

In FIG. 6B, a normalized background signal 120 can be achieved by application of gain-based normalization using scaling factors calculated in the manner described above. As illustrated, the normalized background signal 120 is uniformly flat in a cross-web direction, where each pixel position produces a normalized light level of 100 when a scan is performed on the calibration background material. However, the techniques applied herein recognize that, although the approach may be applied to achieve uniform intra-device response with respect to background intensity signal calibration, a gain-only approach may not necessarily achieve a uniform system response with respect to defect detection. That is, the techniques herein are based on a recognition that the system response with respect to defect detection may be different from the system response with respect to background variation.

For example, as illustrated in FIG. 6B, application of scaling factors $S_{P1}$ and $S_{P2}$ to the light intensity values 115 and 157 for the same defect at pixel locations P1 and P2 result in normalized values of 127.7 units and 120.7 units, respectively. Thus, although normalized background signal may be rendered uniform by application of scaling, the resultant intensity levels attributed to the same defect at the different pixel locations may nevertheless produce different light intensities. In this example, when located near the edge of the field of view at pixel location P2, the normalized intensity value may fall below a defect classification threshold $T_D$ of 125 light units, causing the anomaly in the material to be disregarded. In contrast, when located near the center of the field of view at pixel location P1, the same defect may produce a normalized intensity value of 127.7 that exceeds the defect classification threshold $T_D$, causing the anomaly in the material to be treated as a defect. This example demonstrates that an original variance in the response of a defect with respect to location within a field of view for the detection device manifests as a variance in classification of the defect even though the background signal was calibrated and normalized using a scaling factor. Moreover, in this example, application of a gain-only normalization approach may cause more anomalies to be classified as defects in the center of the field of view and fewer anomalies to be classified as defects at the edges of the field of view. In some systems, such pixel values may be represented as binary integer values, although for purposes of explanation the units are shown herein as decimal values.

Figure 6C:
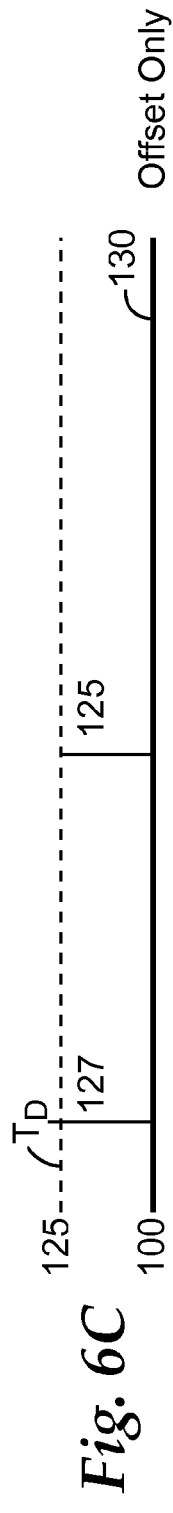

FIG. 6C illustrates example results in the event an offset-only approach was utilized to normalize the background signal to uniform light level of 100 units. In this example, offsets for each position are calculated for the cross-web locations of the field of view and applied as correction values to the corresponding reading at that position. In general, an offset for a particular cross-web pixel location can be calculated as follows:

Offset=Target Normalized Value−Raw Pixel Value

For example, given a target normalization value of 100, an offset $O_{P1}$ for pixel location P1 can be calculated as follows:

$O_{P1}=100-90=10.0$.

Similarly, an offset $O_{P2}$ for pixel location P2 can be calculated as follows:

$O_{P2}=100-130=-30.0$.

As shown in FIG. 6C, a normalized background signal 130 can be achieved by application of offset-based normalization by adding the offsets calculated above to the raw video 110 acquired from the background material. As illustrated, normalized background signal 130 is uniformly flat in a cross-web direction, where each pixel position produces a normalized light level of 100 units upon scanning the calibration background material. However, as stated above, the techniques applied herein recognize that, like the gain-only approach, the offset-only approach may be applied to achieve uniform intra-device response with respect to background calibration, but the offset-only approach may not necessarily achieve a uniform system response with respect to defect detection.

For example, as illustrated in FIG. 6C, application of offsets $O_{P1}$ and $O_{P2}$ to the light intensity values 115 and 157 for the same defect at pixel locations P1 and P2 result in normalized values of 125.0 units and 127.0 units, respectively. Thus, although normalized background signal may be rendered uniform by application of scaling, the resultant intensity levels attributed to the same defect at the different pixel locations may nevertheless produce different light intensities. In this example, when located near the edge of the field of view at pixel location P2, the normalized intensity value exceeds the defect classification threshold $T_D$ of 125 light units, which causes the anomaly in the material to be treated as a defect. In contrast, when located near the center of the field of view at pixel location P1, application of the corresponding offsets causes the same defect to produce a normalized intensity value of 125 that falls below the threshold causing the anomaly to be disregarded. This example demonstrates that an original variance in the response of a defect with respect to location within a field of view for the detection device may manifest as a variance in classification of the defect even though the background light level was calibrated and normalized using offsets for each cross-web location. Moreover, in this example, application of an offset-only normalization approach may cause more anomalies to be classified as defects in at the edges of the field of view and fewer anomalies to be classified as defects in the center of the field of view.

Figure 6D:
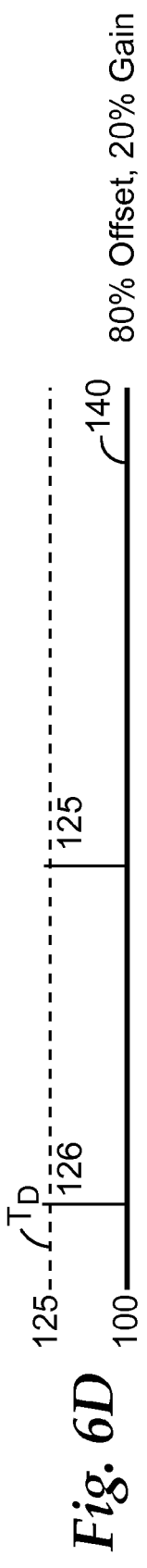

FIG. 6D illustrates a uniform background signal 140 achieved by application of a technique that combines components of gain-based correction with offset-based correction to normalize the raw video 110 acquired from the background material. That is, the techniques apply a proportional correction having constituent components from both gain-based and offset-based normalization, where the selected components are adaptively computed. That is, weighted coefficients $s_1$-$s_n$ may be used to represent proportions for different normalization algorithms, where the coefficients are dynamically adjustable, i.e., tunable. In other words, for each pixel, the techniques described herein are used to select a proportionality between different normalization results on a per pixel-basis, such as a proportionality between a gain-based normalized pixel value and an offset-based normalized pixel value.

In the example of a FIG. 6D, a first coefficient of $s_1$=0.8 is selected and a second coefficient of $s_2$=0.2 is selected, where $s_1$ represents a portion of the normalization to be taken from the offset-based approach and $s_2$ represents a portion of the normalization to be taken from the gain-based approach. In other words, FIG. 6D represents a normalized signal 140 when an 80% weighting for the offset-based normalization algorithm is used in conjunction with a 20% weighting for the gain-based normalization algorithm. As illustrated, normalized background signal 140 is similarly uniformly flat in a cross-web direction, where each pixel position produces a normalized light level of 100 units upon scanning the calibration background material. For example, assuming the coefficients of 20% and 80%, a raw background light level reading of 90 units at pixel P1 having a target normalization value of value 100 would be normalized as:

$$p_i = 0.2 * S_{P1} * 90 + 0.8 * (90 + O_{P1}),$$

$$p_i = 0.2 * 1.11 * 90 + 0.8 * (90 + 10),$$

yielding a normalized pixel value at pixel P1 of:

$$p_i = 100.$$

Similarly, a raw background light level reading of 130 units at pixel location P2 would be normalized to a value of 100.

However, with respect to defect classification, the light intensity values 115 and 157 for the same defect at pixel locations P1 and P2 result in normalized values of 125.6 units and 125.8 units, respectively. Thus, by selection of an 80/20 ratio for offset/gain correction, the resultant intensity levels attributed to the same defect at the different pixel locations produce substantially the same normalized light intensities using the techniques described herein. In this example, the normalized intensity values at both pixel locations P1 and P2 exceed the defect classification threshold $T_D$ of 125 light units, which causes the anomaly in the material to be classified as a defect. Although system response to a defect may vary with respect to location within a field of view for a given detection device, this variance may be accounted for using the calibration and normalization approach described herein.

In general, the techniques may be viewed as applying a polynomial correction on a per-pixel basis in which different normalization schemes are weighted with different coefficients so as to achieve uniform defect detection in a cross-web direction for a field of view for a given image capture device. The higher-order polynomial for pixel correction may generally be represented as:

$$P_i = s_n Z p_i^n + \ldots + s_3 C p_i^2 + s_2 B p_i + s_1 A,$$

where $P_i$ represents the corrected pixel value, $p_i$ represents the raw pixel value, A, B . . . Z represent different algorithms for image correction (e.g., offset based, gain based, background subtraction, dark offsets), and $s_1$-$s_n$ are coefficients for the polynomial. These coefficients $S_1$-$s_n$ represent normalization portions to be taken from the different algorithms, where the coefficients are dynamically adjustable, i.e., tunable. In other words, the techniques described herein are used to select a proportionality between different normalization results on a per pixel-basis, such as a proportionality between a gain-based normalized pixel value and an offset-based normalized pixel value as shown above. The same proportionality may be used for all pixels or may be determined for each pixel.

This flexible approach can be useful in many different industrial applications. In some situations, for example, the material being manufactured and inspected may tend to have homogeneous structures that pass light uniformly, such as gray films. For such films, an increase in light intensity applied to the film when inspecting the film results in a similar increase in the light intensity received by the visual inspection system. In such cases, a technique more weighted toward gain-based normalization may be preferable. In this case, $S_1$ may approach zero. In other cases, techniques may be more weighted to offset-based normalization may be preferable, i.e., $s_2$ may approach zero. Such techniques may be useful, for example, with so called dark-field applications where normal film response results in diminished or no light reaching the sensor unless a defect is present. In still other cases, neither $s_1$ nor $s_2$ are set to zero, providing for a proportional normalization scheme. Moreover, in some cases the techniques may be used to apply correction using a higher-ordered polynomial. This may be useful, for example, when the material may be an active optical film, such as light guide, where the optical nature of the material changes in the cross-web direction.

An alternative method for applying proportional image correction is to take an iterative approach to the proportionality where the proportionality for any given normalization algorithm is based at least in part on the proportionality previously determined for any normalization algorithms having a lower order within the polynomial. For example, this can be done by first calculating a required offset amount (for instance) and using only a portion of that amount such that the remainder of the required correction is obtained through gain or additional normalization techniques associated with a higher-order. In this method there is a single proportionality constant and the higher order coefficients are dependent upon this scalar. The following equations summarize this implementation for a first order polynomial:

$$P_i = G_i(p_i - sO_i)$$
$$O_i = \overline{P}_i - T$$
$$G_i = \frac{T}{\overline{P}_i - sO_i},$$

where $p_i$ is the raw pixel value, s is the proportionality constant (per pixel or fixed for all pixels), T is the target normalization value, $\overline{P}_i$ is the average background pixel value, $O_i$ is the average pixel offset, and $G_i$ is the pixel gain. This approach yields the same results as shown in FIG. 6D when s=0.80. This can be thought of as taking 80% offset and 20% gain. Different inspection arrangements and materials may not necessarily yield the same proportionality (e.g. 80/20) between the two implementations.

Figure 7:
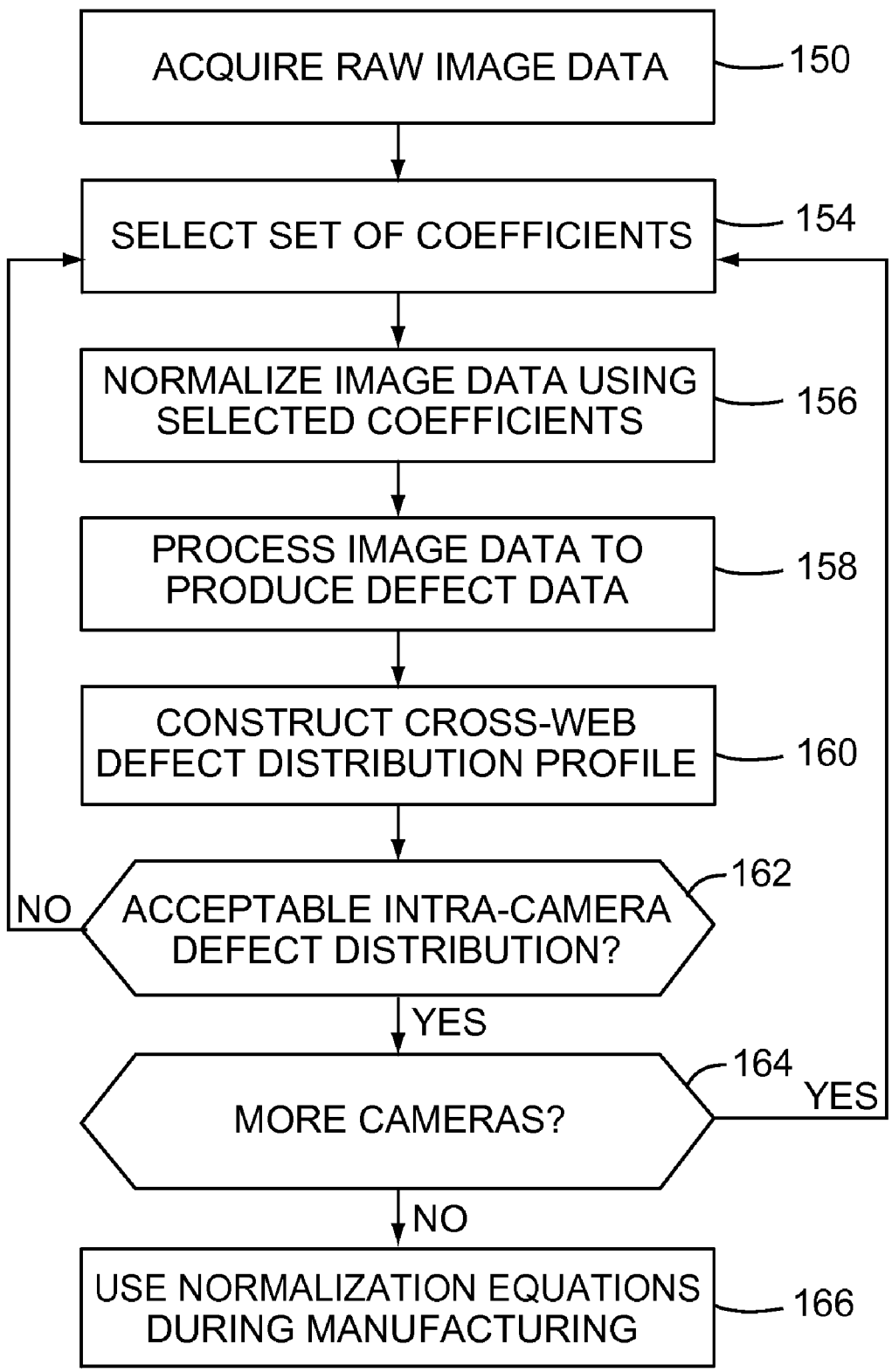
FIG. 7 is a flowchart illustrating an example process for determining coefficients of a polynomial to be used for normalization of the raw video data received by a visual inspection system.

FIG. 7 is a flowchart illustrating an example process for determining the coefficients of the polynomial to be used for normalization of the raw video data received by a visual inspection system. In one example embodiment, a calibration material is initially processed with the image capture devices of the visual inspection system of the manufacturing line to produce raw video data (150). The calibration material may, for example, be a material of the type to be produced by the manufacturing line, where the calibration material may have a know defect distribution profile. For example, when considered over the entire length of the calibration material, the distribution of defects in the cross-web direction may be substantially uniform such that no particular cross-web location has a statistically significant increase or decrease in defects relative to the other cross-web locations. In another example, the raw video data may be captured in real-time from a material as the material is being manufactured, and an average, cross-web defect distribution profile may be repeatedly computed and adaptively adjusted in real-time after inspection of a given length of the manufactured web material, such as 50 meters of the web material. In this example, it may be assumed that the real cross-web defect distribution of the manufactured web material should be uniform or otherwise conform to a known profile.

In either case, a process engineer or automated software selects an initial set of coefficients to be used for the intra-device pixel normalization equation (154). That is, an initial proportionality is chosen for each of the available image normalization algorithms. The initial set of coefficients may be selected from default coefficients previously configured by the process engineer, and may be selected based on the type of material to be manufactured. As one example, for gray films, default coefficients of 100% gain and 0% offset may be initially configured. For dark-field applications, default coefficients of 0% gain and 100% offset may be used. As another example, default coefficients for a first order polynomial may be configured for other types of for per-pixel normalization with a proportionality of 80% offset and 20% gain.

After selecting the initial set of coefficients, the raw image data is normalized using the currently selected set of coefficients to compute normalized values at each cross-web pixel location for each scan line over the down-web length of the image data (156). The normalized image data is then analyzed using one or more recipes to classify detected anomalies into defects or corresponding sets of defects for the different recipes (158).

The resultant defect data is then analyzed and a defect distribution profile is built in a cross-web direction for the field of view of the currently selected camera (160). That is, a sum of the number of defects is determine for each cross-web location over the down-web length of the image data to form a cross-web defect distribution profile for the calibration material or segment of material currently being manufactured.

The defect distribution profile is then examined, either by the process engineer or the automated software, to determine if the defect distribution profile is acceptably flat. As one example, the defect distribution profile may be analyzed to determine a range between a cross-web intra-camera location having a maximum number of defects and a location having a minimum number of defects. A tolerance level, such as a difference of 1% between the locations having the maximum and minimum number of defects may be used to determine whether the current coefficients resulted in an acceptable defect distribution profile. Other techniques may be used to determine whether the current defect distribution profile is flat, such as a standard deviation between the number of defects at each intra-camera pixel location.

If the defect distribution profile is not acceptable, the process engineer or the automated software selects a different set of weighted coefficients for the intra-device pixel normalization equation (154). As one example, assuming the current coefficients specify 100% gain-based normalization and 0% offset-based normalization, the coefficients may be adjusted by a defined increment to specify, for example, 95% gain and 5% offset. The raw image data is then normalized using the new coefficients and a defect distribution profile is constructed and analyzed to determine if the defect distribution is acceptable (156-162). This process continues and may iteratively be applied to sequence through the coefficient combinations of for higher order polynomials until an acceptable defect distribution profile is achieved.

Once an acceptable defect distribution profile is achieved (yes of 162), the process is repeated for each image capture device of the visual inspection system (164). In this way, intra-device pixel normalization equations are developed for each image capture device. Once developed, the intra-device pixel normalization equations are applied to normalize raw image data from the respect image capture device, and the normalized image data is processed to identify portions of the web material having defects when converting the web material into one or more products.

Figure 8:
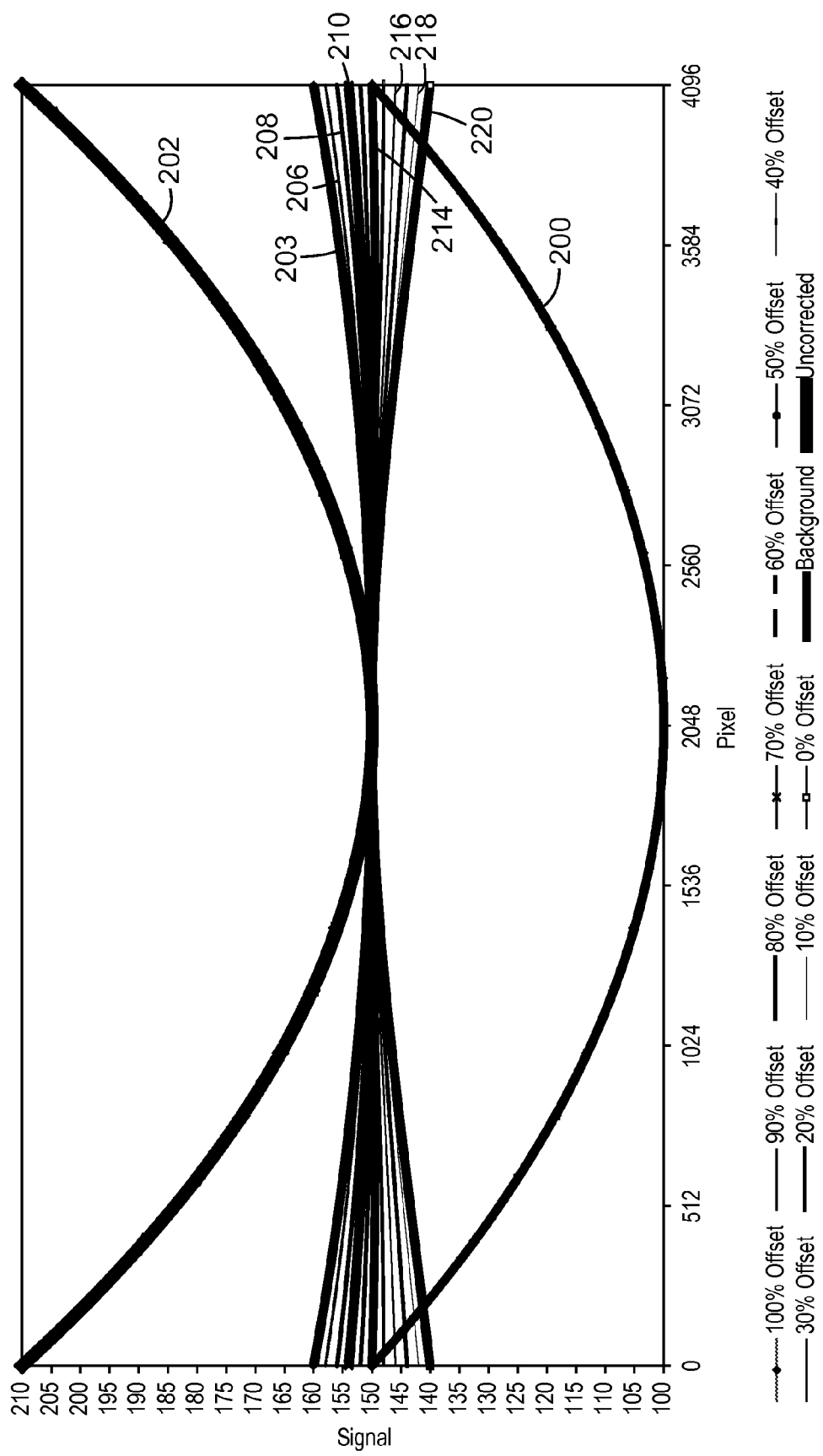
FIG. 8 is a graph showing example defect distribution profiles computed from model raw image data for a web material.

FIG. 8 is a graph showing defect distribution profiles computed from model raw image data for a web material. As shown in FIG. 8, when utilizing a background material, the image capture device produced an average background signal 200. This may represent the average per-pixel background value over the length of the material segment or a background signal over a single cross-web pixel line. In either case, as shown, background signal 200 indicates that the image capture device is more sensitive on the edges of the field of view. In addition, FIG. 8 shows an uncorrected cross-web defect distribution profile 202 for the image data. In this example, the uncorrected defect distribution profile 202 is depicted relative to light intensity to illustrate a system response when a defect is presented at each of the cross-web pixel locations of the image capture device. In other examples, defect distribution profile 202 may be computed as a summation of the number of defects detected at each pixel location over a defined down-web length of material.

The remaining plots of FIG. 8 serve to further illustrate the process described above by which a process engineer or automated software selects the coefficients to be used for the intra-device pixel normalization equation. In this example, plot 203 shows a system response to defect detection when coefficients for 100% offset-based correction and 0% gain-correction are applied for normalization of the raw pixel data. The remaining plots 204-220 show system responses when the techniques described herein are applied to iteratively sequence through the coefficient combinations ranging from 100% offset-based normalization down to 100% gain-based normalization using a 10% decrement between each iteration. At each iteration, the proportion of the offset-based component is adjusted and a remaining portion of correction is achieved using the gain-based coefficient, producing offset/gain weighted combinations from 100% offset/0% gain to 0% offset/100% gain.

As shown in FIG. 8, neither the 100% offset-based nor the 100% gain-based approach resulted in substantially flat normalization. That is, 100% offset-based normalization produced a defect distribution profile 202 that resulted in an increase in defects at the edges, while 100% gain approach resulted in a defect distribution profile 200 that resulted in n increase in defects in the center of the field of view. In this example, of the computed coefficient combinations, a proportionality of 50/50 for offset-based normalization to gain-based normalization produced a distribution profile 214 having the flattest or most uniform cross-web, intra-camera profile. Consequently, in this example, an intra-device pixel normalization equation of:

$$p_i = 0.5 * S_{P1} * 90 + 0.5 * (90 + O_{P1}),$$

would be selected and used to normalize the raw image value at each pixel location, where $S_{P1}$ and $O_{P1}$ represent the gain-based scaling factor and the offset value, respectively, that would independently normalize a raw background light intensity value at that pixel to a target light intensity value. Using the selected coefficients for the intra-device pixel normalization algorithm allows the modeled data of FIG. 8 to achieve normalization of a system response with respect to both the background signal and defect detection in a cross-web direction across the field of view of the image capture device.

Figure 9:
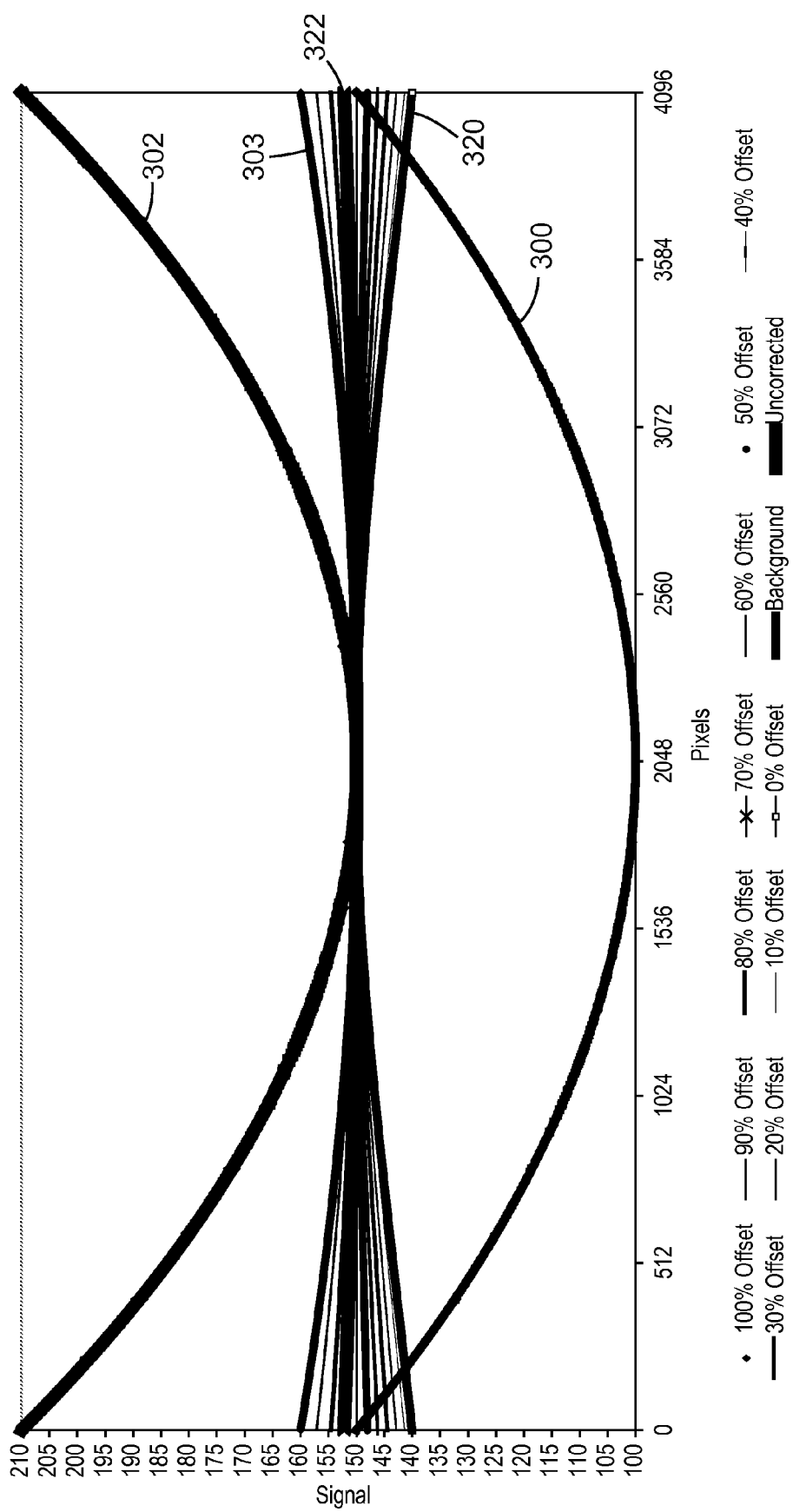
FIG. 9 is a graph showing second example defect distribution profiles computed from model raw image data for a web material.

FIG. 9 is a graph showing defect distribution profiles computed from model raw image data for a web material. In this example, background signal 300 and uncorrected pixel values 302 are the same as in FIG. 8. The remaining plots of FIG. 9 serve to further illustrate the process described above by which a process engineer or automated software selects the offset proportionality constant (s) to be used for the intra-device pixel normalization equation. In this example, plot 303 shows a system response to defect detection when coefficients for 100% offset-based correction (s=1.0) and 0% gain-correction are applied for normalization of the raw pixel data. The remaining plots show system responses when the techniques described herein are applied to iteratively sequence through the coefficient combinations ranging from 100% offset-based normalization (plot 303) down to 100% gain-based (plot 320) normalization using a 10% decrement between each iteration. At each iteration, the proportion of the offset-based component is adjusted and a remaining portion of correction is achieved using the gain-based coefficient, producing offset/gain weighted combinations from 100% offset/0% gain to 0% offset/100% gain.

As shown in FIG. 9, neither the 100% offset-based nor the 100% gain-based approach resulted in substantially flat normalization. That is, 100% offset-based normalization produced a defect distribution profile 302 that resulted in an increase in defects at the edges, while 100% gain approach resulted in a defect distribution profile 320 that resulted in an increase in defects in the center of the field of view. In this example, of the computed coefficient combinations, a proportionality of 60/40 for offset-based normalization to gain-based normalization (as opposed to 50/50 for the normalization implementation used to generate FIG. 8) produced a distribution profile 322 having the flattest or most uniform cross-web, intra-camera profile. Consequently, in this example, an intra-device pixel normalization equation of:

$$P_i = G_i(p_i - 0.6O_i) = \frac{T}{\overline{P}_i - 0.6O_i}(p_i - 0.6O_i)$$

would be selected and used to normalize the raw image value at each pixel location, where $G_i$ and $O_i$ represent the gain-based scaling factor and the offset value, respectively, that would normalize a raw background light intensity value at that pixel to a target light intensity value. Using the selected coefficients for the intra-device pixel normalization algorithm allows the modeled data of FIG. 9 to achieve normalization of a system response with respect to both the background signal and defect detection in a cross-web direction across the field of view of the image capture device.

Various embodiments of the invention have been described. These and other embodiments are within the scope of the following claims.

The invention claimed is:

1. A method comprising:
capturing image data from a manufactured material using an image capture device;
applying a first one of a plurality of normalization functions to the image data to produce a first normalized value for each pixel of the image;
applying a second one of plurality of normalization functions to the image data to produce a second normalized value for each of the pixels;
computing a final normalized value for each pixel as a sum of a portion of the first normalized value and a portion of the second normalized value for each of the pixels;
processing the final normalized values to identify regions on the manufactured material containing anomalies that represent potential defects in the manufactured material;
analyzing the anomalies to determine a defect distribution profile for the manufactured material;
adjusting the portion of the first normalized value and the portion of the second normalized value used when computing the final normalized value for each of the pixels so that the defect distribution profile is substantially uniform; and, wherein computing a final normalized value for each pixel comprises applying a higher-ordered polynomial in which a plurality of different normalization schemes are applied on a per-pixel basis and summed using coefficients that achieve a substantially uniform defect detection for a field of view of the image capture device.

2. The method of claim 1, further comprising:
imaging a background material with the image capture device to provide background image data; and
selecting the plurality of different normalization functions so that each of the different normalization functions normalize the background image data for each of a plurality of pixels to a common desired background value.

3. The method of claim 2, further comprising:
selecting weightings that determine the portion of the first one of plurality of normalization functions and the portion of the second one of the plurality of normalization functions.

4. The method of claim 1, wherein adjusting the portion of the first normalized value and the portion of the second normalized value comprises adjusting the portions in real-time when the manufactured material is manufactured.

5. The method of claim 1,
wherein the first one of the normalization algorithms is an offset-based normalization algorithm; and
wherein the second one of the normalization algorithms is a gain-based normalization algorithm.

6. The method of claim 1,
wherein the manufactured material comprises web material, and
wherein the image data comprises an image of a cross-web portion of the web material across a field of view of the image capture device.

7. The method of claim 1, wherein adjusting the portion of the first normalized value and the portion of the second normalized value comprises:
determining the portion of the first normalized value; and
determining the portion of the second normalized value based on the previously determined portion of the first normalized value.

8. A system comprising:
an image capture device to capture image data from a manufactured material, wherein the image data comprises pixel values for a field of view of the image capture device;
a computer-readable medium storing parameters for a plurality of different normalization algorithms to normalize a background signal for the image capture device to a common desired value, wherein the computer-readable medium further stores a coefficient for each of the plurality of normalization algorithms; and
an analysis computer that computes normalized value for each of the pixels of the image data as a weighted summation of results from application of at least two of the pixel normalization algorithms using the stored parameters, wherein the stored coefficients define weightings for the results of each of the different normalization algorithms, and wherein the analysis computer computes the normalized value for each pixel by applying a higher-order polynomial in which a plurality of the different normalization schemes are applied on a per-pixel basis and the results are summed using the coefficients as weightings.

9. The system of claim 8, wherein the analysis computer processes the normalized values for each of the pixels to identify regions on the manufactured material containing anomalies that represent potential defects in the manufactured material.

10. The system of claim 8, wherein the analysis computer computes the normalized value for each of pixels by applying a first one of a plurality of normalization functions to the image data to produce a first normalized value for each pixel of the image, applying a second one of plurality of normalization functions to the image data to produce a second normalized value for each of the pixels, and computing the normalized value for each pixel as a combination of a portion of the first normalized value and a portion of the second normalized value for each of the pixels.

11. The system of claim 10,
wherein the first one of the normalization algorithms is an offset-based normalization algorithm, and
wherein the second one of the normalization algorithms is a gain-based normalization algorithm.

12. The system of claim 8, wherein the coefficients for the plurality of different normalization functions weight each of the different normalization functions so that detection of anomalies using the image data is substantially uniform across a field of view of the image capture device.

13. The system of claim 8, wherein the analysis computer adjusts the coefficients in real-time when the manufactured material is manufactured.

14. The system of claim 8,
wherein the manufactured material comprises web material, and
wherein the image data comprises an image of a cross-web portion of the web material across a field of view of the image capture device.

15. A non-transitory computer-readable storage medium comprising program code having instructions that cause a programmable processor to:
receive image data from a web material using the image capture device, wherein the image data comprises an image of a cross-web portion of the web material across a field of view of the image capture device;
apply a first one of a plurality of normalization functions to the image data to produce a first normalized value for each pixel of the image;
apply a second one of plurality of normalization functions to the image data to produce a first normalized value for each of the pixels;
compute a final normalized value for each pixel as a sum of a portion of the first normalized value and a portion of the second normalized value for each of the pixels;
process the final normalized values to identify regions on the web material containing anomalies that represent potential defects in the web material; and,
wherein instructions cause the processor to compute the final normalized value for each pixel by applying a higher-ordered polynomial in which a plurality of different normalization schemes are applied on a per-pixel basis and summed using coefficients that achieve a substantially uniform defect detection in a cross-web direction for the field of view of the image capture device.

16. The computer-readable storage medium of claim 15,
wherein the first one of the normalization algorithms is an offset-based normalization algorithm, and
wherein the second one of the normalization algorithms is a gain-based normalization algorithm.

* * * * *

UNITED STATES PATENT AND TRADEMARK OFFICE
CERTIFICATE OF CORRECTION

PATENT NO.        : 8,270,701 B2
APPLICATION NO.   : 12/684170
DATED             : September 18, 2012
INVENTOR(S)       : Steven Paul Floeder It is certified that error appears in the above-identified patent and that said Letters Patent is hereby corrected as shown below:

In the Specifications:

Column 2
Line 60; delete "computes normalized" and insert --computes a normalized-- therefor.

Column 3
Line 34; delete "both to Steven" and insert --both of Steven-- therefor.

Column 6
Line 27; delete "(Totawa, N.J.)" and insert --(Totowa, N.J.)-- therefor.
Line 61; delete "across then" and insert --across the-- therefor.

Column 8
Line 29; delete "721" and insert --72I-- therefor.
Line 51; delete "stores site location" and insert --store site location-- therefor.

Column 9
Line 36; delete "721" and insert --72I-- therefor.
Line 36; delete "721" and insert --72I-- therefor.
Line 38; delete "721" and insert --72I-- therefor.

Column 11
Line 5; delete "reference" and insert --reference.-- therefor.
Line 26; delete "offset-based normalization" and insert --offset-based correction-- therefor.
Line 33; delete "prior." and insert --prior to normalization.-- therefor.

Column 13
Line 20; delete "application of scaling" and insert --application of offsets-- therefor.

Signed and Sealed this
Third Day of September, 2013

Teresa Stanek Rea
*Acting Director of the United States Patent and Trademark Office*

CERTIFICATE OF CORRECTION (continued)
U.S. Pat. No. 8,270,701 B2

Column 14
Line 17; delete "125.6" and insert --125.5-- therefor.
Line 18; delete "125.8" and insert --125.7-- therefor.
Line 43; delete "$S_1-s_n$" and insert --$s_1-s_n$-- therefor.
Line 60; delete "$S_1$" and insert --$s_1$-- therefor.

Column 15
Line 47; delete "know" and insert --known-- therefor.

Column 16
Line 51; delete "of for" and insert --of-- therefor.
Line 59; delete "respect" and insert --respective-- therefor.